US008033794B2

(12) United States Patent
Lee

(10) Patent No.: US 8,033,794 B2
(45) Date of Patent: Oct. 11, 2011

(54) WIND TURBINE

(76) Inventor: Jia-Yuan Lee, Taipei (TW)

( * ) Notice: Subject to any disclaimer, the term of this patent is extended or adjusted under 35 U.S.C. 154(b) by 336 days.

(21) Appl. No.: 12/471,481

(22) Filed: May 26, 2009

(65) Prior Publication Data

US 2010/0301612 A1 Dec. 2, 2010

(51) Int. Cl.

| | |
|---|---|
| ***B63H 13/00*** | (2006.01) |
| ***B63H 15/00*** | (2006.01) |
| ***B64C 11/14*** | (2006.01) |
| ***B64C 27/32*** | (2006.01) |
| ***F01D 5/00*** | (2006.01) |
| ***F01D 25/00*** | (2006.01) |
| ***F03B 1/02*** | (2006.01) |
| ***F03B 11/00*** | (2006.01) |
| ***F03D 11/00*** | (2006.01) |
| ***F04D 29/00*** | (2006.01) |

(52) U.S. Cl. ...................................... 416/244 R; 416/11

(58) Field of Classification Search .............. 416/224 R, 416/114

See application file for complete search history.

(56) References Cited

U.S. PATENT DOCUMENTS

| | | | | |
|---|---|---|---|---|
| 4,353,681 | A * | 10/1982 | Doman | 416/11 |
| 4,533,297 | A * | 8/1985 | Bassett | 416/132 B |
| 6,327,957 | B1 * | 12/2001 | Carter, Sr. | 91/41 |
| 7,931,444 | B2 * | 4/2011 | Godsk et al. | 416/228 |
| 2004/0057828 | A1 * | 3/2004 | Bosche | 416/1 |
| 2006/0159550 | A1 * | 7/2006 | Nagao | 416/132 B |
| 2009/0129931 | A1 * | 5/2009 | Stiesdal | 416/204 R |
| 2009/0257885 | A1 * | 10/2009 | Godsk et al. | 416/244 R |

* cited by examiner

*Primary Examiner* — David Zarneke
(74) *Attorney, Agent, or Firm* — Leong C. Lei

(57) ABSTRACT

A wind turbine includes a nacelle that houses a dynamo and a vane wheel coupled to an end of the dynamo. The nacelle is movably mounted to a post. The nacelle has a body forming a circumferentially extending curved slot that has a front portion forming a reducing section and a rear portion forming an expanding section. The vane wheel has a hub at a center thereof and including a plurality of blades radially extending therefrom. Each blade has an end forming a down wash. With the curved design of the nacelle body, the rising angle of airflow exiting the nacelle is improved and with the down wash, the occurrence of tip vortex is suppressed, whereby the utilization efficiency of wind energy in the wind generation operations is improved.

7 Claims, 6 Drawing Sheets

52
31
32
50
3233
3231 3231
323

WIND TURBINE

TECHNICAL FIELD OF THE INVENTION

The present invention generally relates to wind generation, and particularly to a wind generation structure comprising a nacelle having a curved configuration and employing down washes to reduce the occurrence of tip vortexes.

DESCRIPTION OF THE PRIOR ART

Recently, scientists have been devoted themselves in the development of new and substitute energy sources, among which the most commonly known includes solar energy, wind energy, tidal energy, or biomass energy, for the purposes of converting the unlimited power provided by the Nature into all kinds of useful energy. Wind energy is an almost unlimited and easy to use energy source and is generated due to air convection caused by locally unbalanced heating of the atmosphere. A conventional wind turbine uses the air flows of wind to drive the rotation of a vane wheel, so as to convert the wind energy into electrical energy. Besides the site of installation of the wind turbine, the structure of the wind turbine, such as shape and number of blades, may also affect the utilization efficiency of wind energy.

Based on the direction along which the wind is received, the wind turbine is classified as up-wind turbine and down-wind turbine. Most of the wind turbines that are currently used is the up-wind turbine, of which the operation is to allow air flows caused by winds to directly impinge a front surface of a vane wheel to drive the rotation of the vane wheel in order to convert the wind energy into electrical energy. The windward surface of the vane wheel must be in alignment with the direction of the winds in order to obtain the maximum performance of the vane wheel. Thus, most of the wind turbines are provided with wind tracking feature, which uses an anemometer to detect the wind direction and actuates a drive device to move the vane wheel in order to follow the wind direction. This makes the wind turbine of this type very expensive. Further, for a down-wind turbine, the vane wheel is arranged behind a nacelle and the nacelle is mounted to a post in an eccentric manner. Due to the condition that the rotation center and the support point do not coincide, when the vane wheel is driven by winds, air flows may automatically get into the nacelle through a nose thereof. The distance between the vane wheel and the nacelle support point provide an arm of force, which induces a torque to move the vane wheel so as to automatically follow the wind direction.

Referring to FIG. 1 of the attached drawings, for both up-wind and down-wind turbines, the turbine 10 is movably mounted on a post 20. The wind turbine 10 comprises a nacelle 11, a dynamo 12, and a vane wheel 13. The nacelle 11 has a streamline configuration resembling a bullet head. The outer surface of the nacelle 11 is of a curved shape having a front end that is gradually expanded toward a middle section of the nacelle 11 and then gradually reduced. Airflows (as indicated by arrows in the drawing) enter from the front end of the nacelle 11 and is caused to expand outward. A portion of the airflows passes over the middle section of the nacelle 11 and contracts inward. Both the outward expanding portion and the inward contracting portion of the air flows impinge the vane wheel 13 and induce turbulence. Further, the vane wheel 13 comprises a plurality of blades arranged on an outer circumference thereof to provide a driving force to drive the rotation of the rotation of the vane wheel 13 due to the wind pressure acting thereon, thereby converting the wind energy into electrical energy. The airflows, when passing through the ends of the blades 131, may induce tip vortexes and generate wind noise, but the end portions of the blades 131 are the portions of the vane wheel 13 that generate the greatest torque when the vane wheel 13 is rotating. The tip vortex may induce a force in an opposite direction to the vane wheel 13, which partially counteract the driving force of the vane wheel 13. Thus, both the design of the nacelle and the design of the blades affect the utilization efficiency of wind energy and may thus influence the performance of wind generation.

SUMMARY OF THE INVENTION

An objective of the present invention is to provide a nacelle structure of a wind turbine, which reduces the drag caused by turbulent flows and increases wind pressure so as to improve the utilization efficiency of wind energy.

Another objective of the present invention is to provide a nacelle structure of a wind turbine, which features automatic wind tracking.

A further objective of the present invention is to provide a wind turbine, which reduces the occurrence of tip vortex and wind noise generated by the rotation of a vane wheel, so as to improve the utilization efficiency of wind energy.

In accordance with the present invention, a wind turbine comprises a nacelle, a dynamo, and a vane wheel. The nacelle comprises a nose and a body. The nacelle body forms a circumferentially extending curved slot, which comprises a front portion that forms a reducing section and a rear portion that forms an expanding section with a valley being defined between the reducing section and the expanding section. At least one fin is set in the circumferentially extending curved slot in such a way that the fin is substantially parallel to an axial direction of the nacelle body. The vane wheel forms, at a center thereof, a hub from which a plurality of blades radially extends. Each blade has an end forming a down wash, which is bent in a direction opposite to a windward surface of the blade and forms an included angle substantially equal to or greater than 90 degrees with respect to the blade.

As such, when the present invention is driven by a high speed airflow, the reducing section of the nacelle body induces a vacuum effect that attracts the airflow and the expanding section changes a rising angle of the airflow to make the airflow directly impinge the blades of the vane wheel, so as to reduce turbulence and increase wind pressure, thereby substantially improving utilization efficiency of wind energy. The fin set in the circumferentially extending curved slot provides a deflecting angle with respect to a flow direction of airflow when winds change directions, so as to induce a driving force for making shift of the nacelle body and thus provide the present invention with a function of automatic wind tracking. Further, when the vane wheel rotates, the down wash formed at an end of each blade may suppress the occurrence of tip vortex and block and guide airflow to reach rearward, thereby substantially improve the utilization efficiency of wind energy in wind generation and reduce the wind noise.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
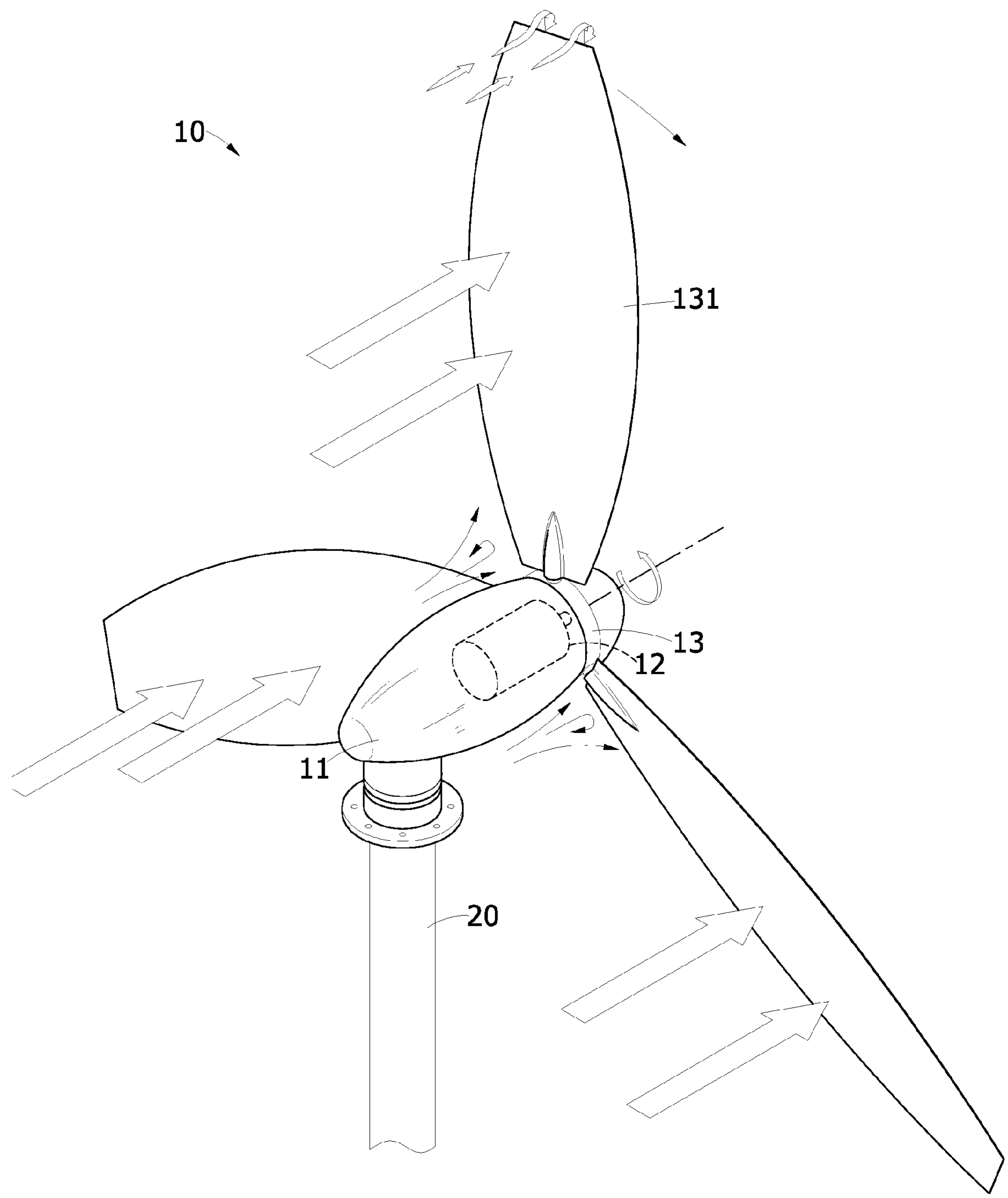
FIG. 1 is a schematic view demonstrating the operation of a conventional wind turbine.
Figure 2:
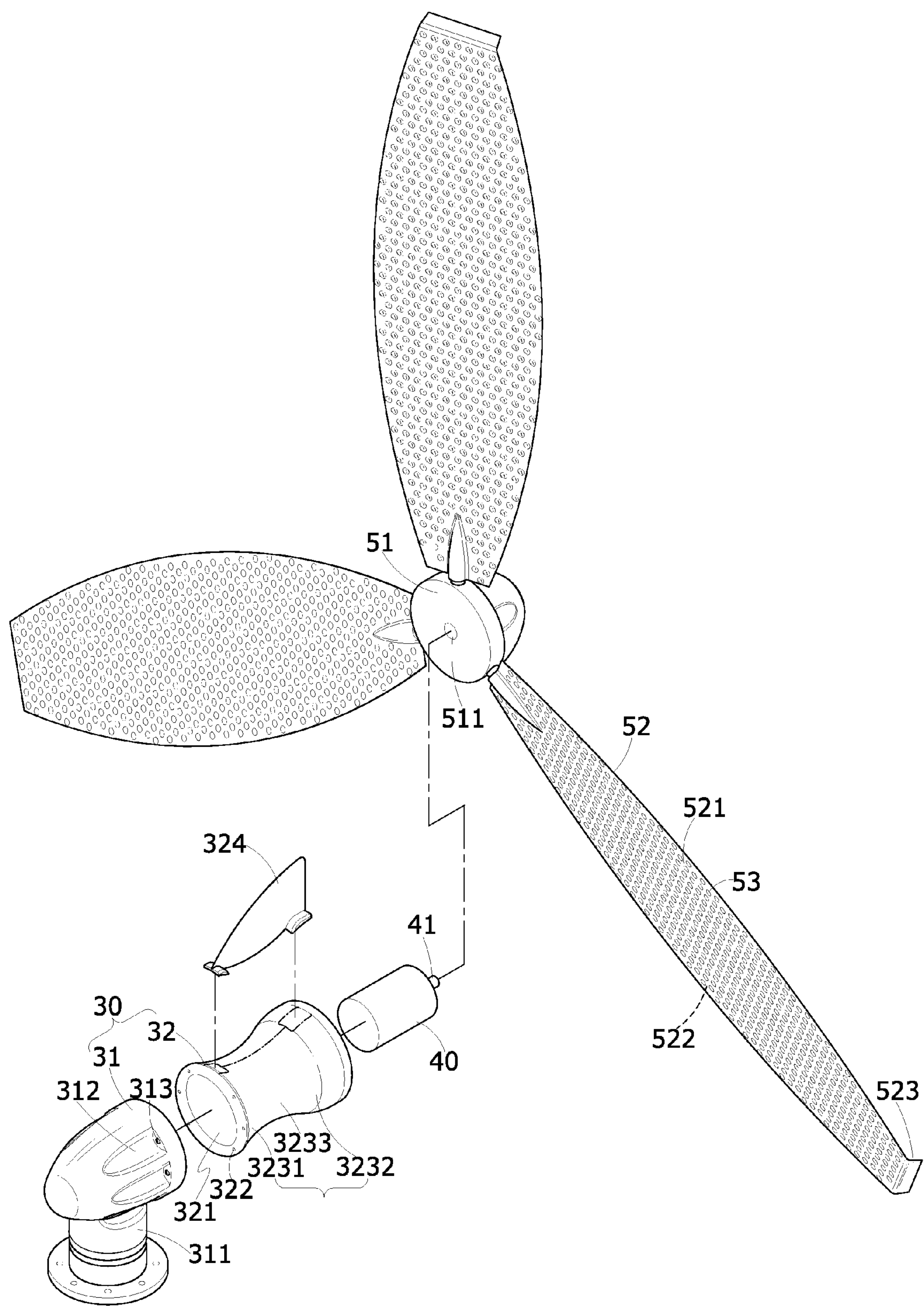
FIG. 2 is an exploded view of a preferred embodiment of the present invention.
Figure 3:
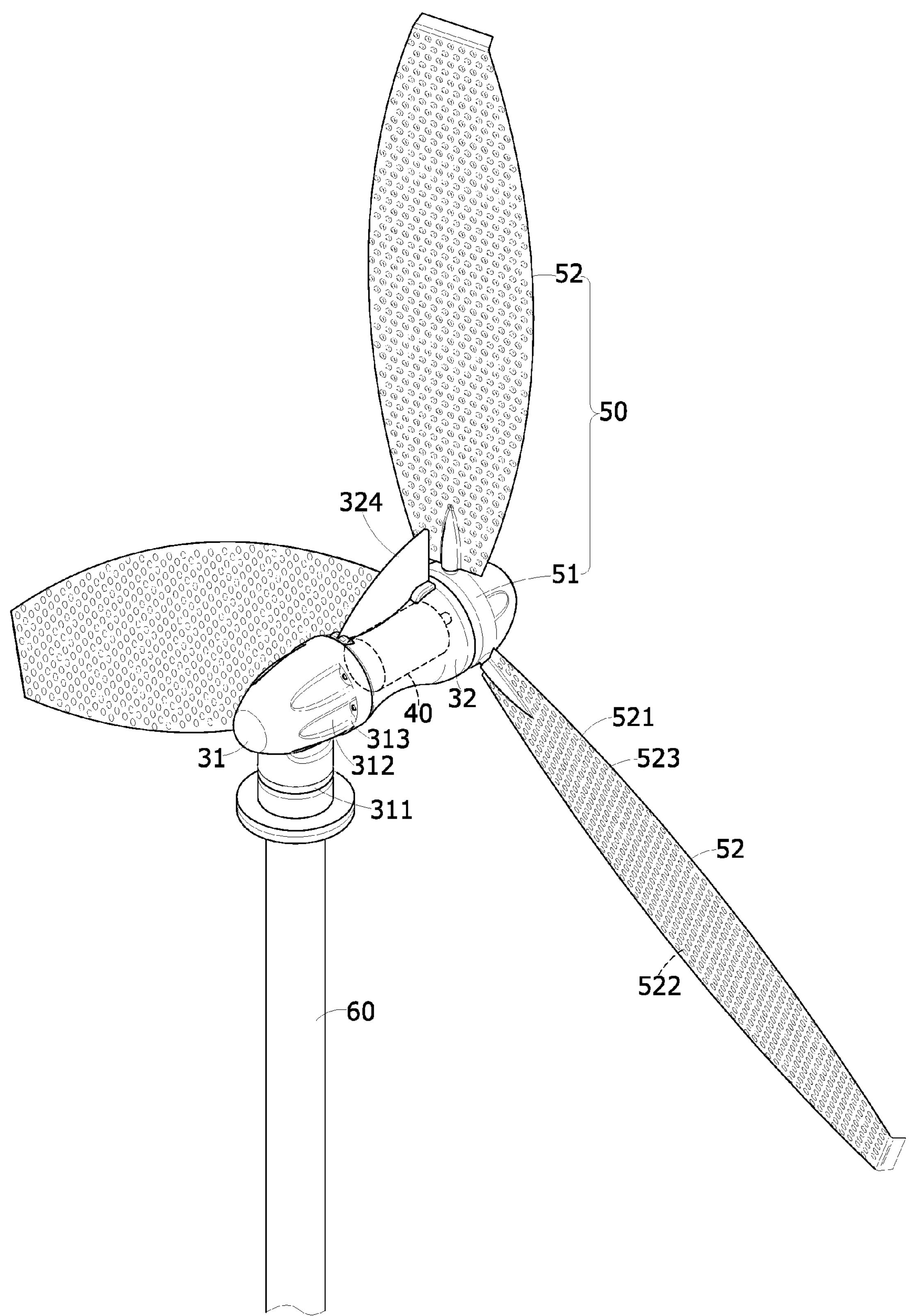
FIG. 3 is a perspective view of the preferred embodiment of the present invention in an assembled form.

With reference to FIGS. 2 and 3, a wind turbine constructed in accordance with a preferred embodiment of the present invention comprises the following components:

A nacelle 30 is composed of a nose 31 and a body 32. The nacelle nose 31 is of a sharp conic shape and is provided with a retention base 311 at an underside thereof. The nacelle nose 31 has a circumferential surface, which defines a plurality of recesses 312 each forming at least one coupling hole 313. The nacelle body 32 is of a hollow cylindrical shape having an interior forming an accommodation chamber 321 and having an end, which opposes the nacelle nose 31 and forms a plurality of mounting holes 322. The coupling holes 312 of the nacelle nose 31 and the mounting holes 322 of the nacelle body 32 are respectively bolted together to form a unitary device. The nacelle body 32 has an outer wall that forms a circumferentially extending curved slot 323. The curved slot 323 has a front portion that forms a reducing section 3231, which is of a configuration that shows successive reduction of diameter, and a rear portion that forms an expanding section 3232, which is of a configuration that shows successive expansion of diameter. The joint between the reducing section 3231 and the expanding section 3232 forms a valley 3233. It is noted that the reducing section 3231 has a radius of curvature that is less than or substantially equal to a radius of curvature of the expanding section 3232, and the reducing section 3231 has an arc length that is less than or substantially equal to an arc length of the expanding section 3232. At least one fin 324 is set in the circumferentially extending curved slot 323 in such a way that the fin 324 is substantially parallel to an axial direction of the nacelle body 32 and the fin 324 projects beyond a surface of the nacelle body 32.

A dynamo 40 is enclosed in the nacelle body 32. The dynamo 40 has a shaft 41 at the center thereof and the shaft 41 extends out of the nacelle 30.

A vane wheel 50 comprises a hub 51 at a center thereof. The hub 51 has a circumference from which a plurality of blades 52 radially extends. The hub 51 forms at a center thereof a shaft hole 511 to be fit and fixed to an end of the shaft 41 to provide a driving coupling therebetween. Each blade 51 has a windward surface 521 and a leeward surface 522. Each blade 52 forms a down wash 523 at a free end thereof. The down wash 523 is bent in a direction opposite to the windward surface 521 of the blade 52 and the down wash 523 forms an included angle, which is substantially equal to or greater than 90 degrees, with the windward surface 521 of the blade 52. The windward surface 521 of the blade 52 forms a plurality of dimples 53, or alternatively, both the windward surface 521 and the leeward surface 522 are provided with a plurality of dimples 53. The dimples 53 are of a hemispherical configuration and thus form a surface that is similar to an outer surface of a golf ball.

To assemble, the retention base 311 of the nacelle nose 31 is mounted to a post 60 to allow the nacelle 30 to rotate on the post 60, whereby when the vane wheel 50 is acted upon by winds, the dynamo 40 is driven to generate electrical power.

Figure 4:
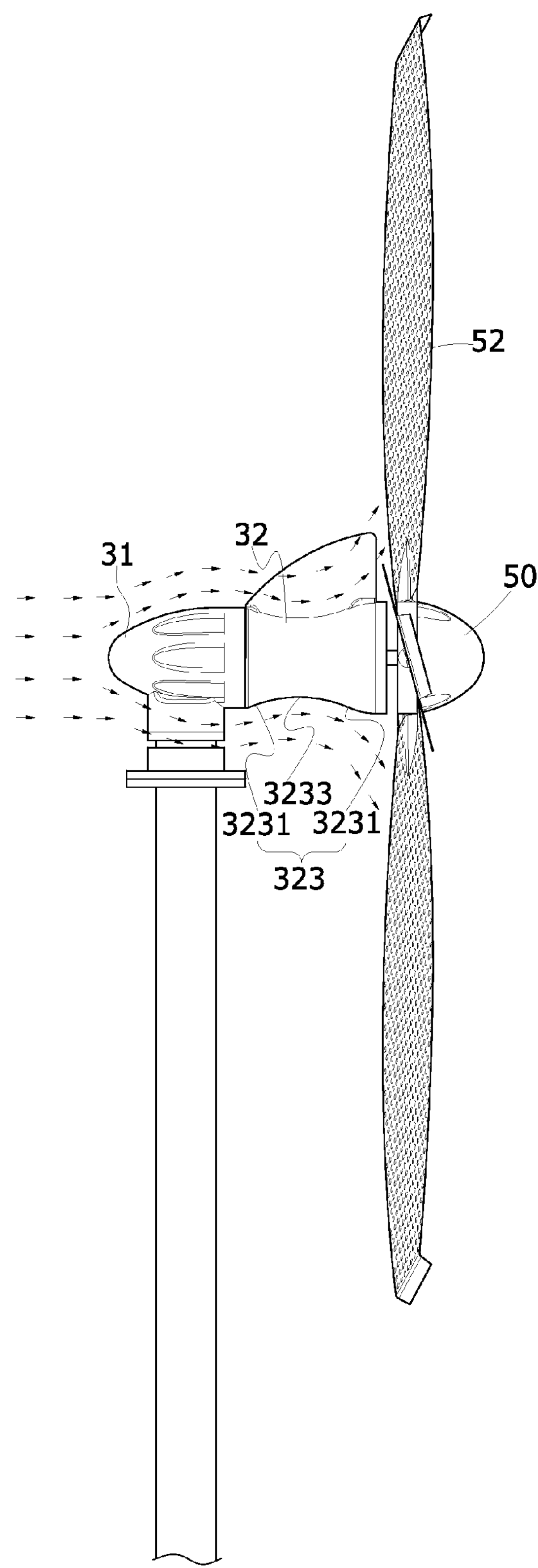
FIG. 4 is a schematic view illustrating a nacelle of the preferred embodiment of the present invention receiving winds acting thereon.

Referring to FIGS. 2 and 4, when the present invention is operated by high speed airflow (arrows shown in the drawing indicating the direction of the airflow), the airflow enters from the nacelle nose 31 and is attracted by a vacuum effect induced by the reducing section 3231 of the nacelle body 32 so that the airflow is caused to move past the valley 3233 of the curved slot 323 to enter the expanding section 3232. The expanding section 3232 improves a rising angle of the airflow when the airflow exits. It is noted that the arrangement of the radii of curvature and the arc lengths of the reducing section 3231 and the expanding section 3232 of the curved slot 323 in accordance with the present invention change speed and reaching distance of the airflow and the rising angle of the exiting airflow, making the airflow directly impinging the vane wheel 50 at a location of the greatest wind impact area or the outermost ends of the blades 52 so as to generate the greatest torque. Thus, the nacelle of the present invention can reduce the drag induced by turbulence, and makes the existing airflow converging and traveling toward the location of the vane wheel 50 having the greatest wind impact area to increase the wind pressure and improve the utilization efficiency of wind energy in wind generation operations. Experiments show that under the condition of identical wind speed, the present invention actually improves the utilization efficiency of wind energy and provides an important technical breakthrough for wind generation.

Figure 5:
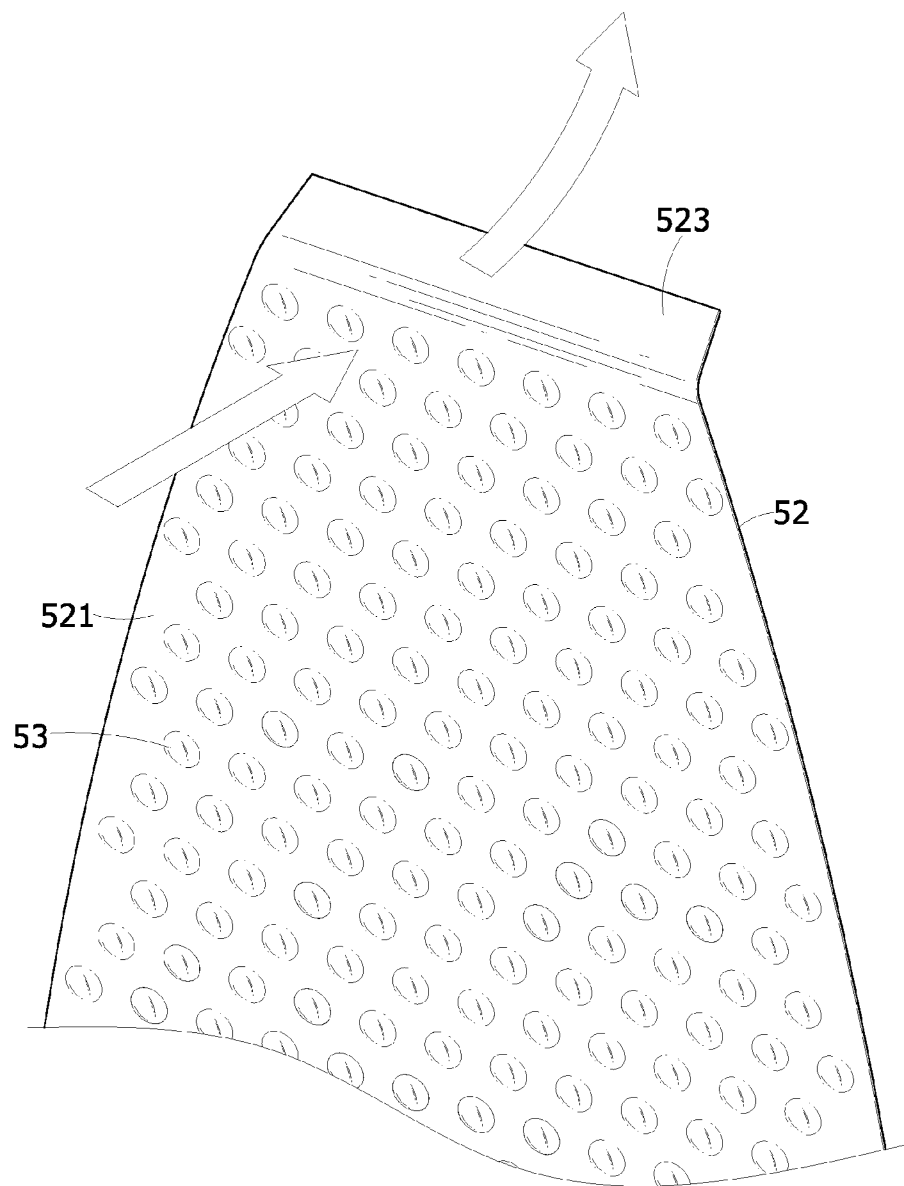
FIG. 5 is a schematic view illustrating movement of airflow when a blade of the preferred embodiment of the present invention receiving winds acting thereon.

Referring to FIGS. 2 and 5, when the vane wheel 50 of the present receives winds acting thereon and thus rotates, the blade 52 receives the impacts of airflow of the wind with the windward surface 521 thereof (the arrows in the drawing indicating the direction of the airflow) so as to cause the vane wheel 50 to rotate for generating electrical power. The present invention uses the down wash 523 formed at the end of the blade 52 to block the airflow that passes over the blade 52 and is likely to form tip vortexes and to direct the airflow to reach rearward for exiting, whereby the occurrence of the tip vortex is significantly reduced. Experiments show that the tip vortex reduces at least 1% of the power generation efficiency. Thus, the arrangement of the down wash 523 in accordance with the present invention may retrieve back the fraction of the power generation efficiency that was previously eliminated by the tip vortex. In other words, this is a way to increase the efficiency of wind generation. Further, the tip vortex at the end of the blade 52 is a factor of the generation of wind noise. The feature of the present invention that reduces the occurrence of tip vortex is certainly also helpful in reducing the wind noise. Further, the surface of the blade 52 is provided with dimples 53 that are similar to the surface dimples of a golf ball and effectively reduce air drag, so that a lifting force is induced by the operation of the blade 52 to increase air flow rate. Thus, the present invention effectively reduces the turbulent flows and wind noise, and concentrates airflow and flowing direction, reduces dusts, and extends the lifespan of the vane wheel 50 and provides a silencing effect.

Figure 6:
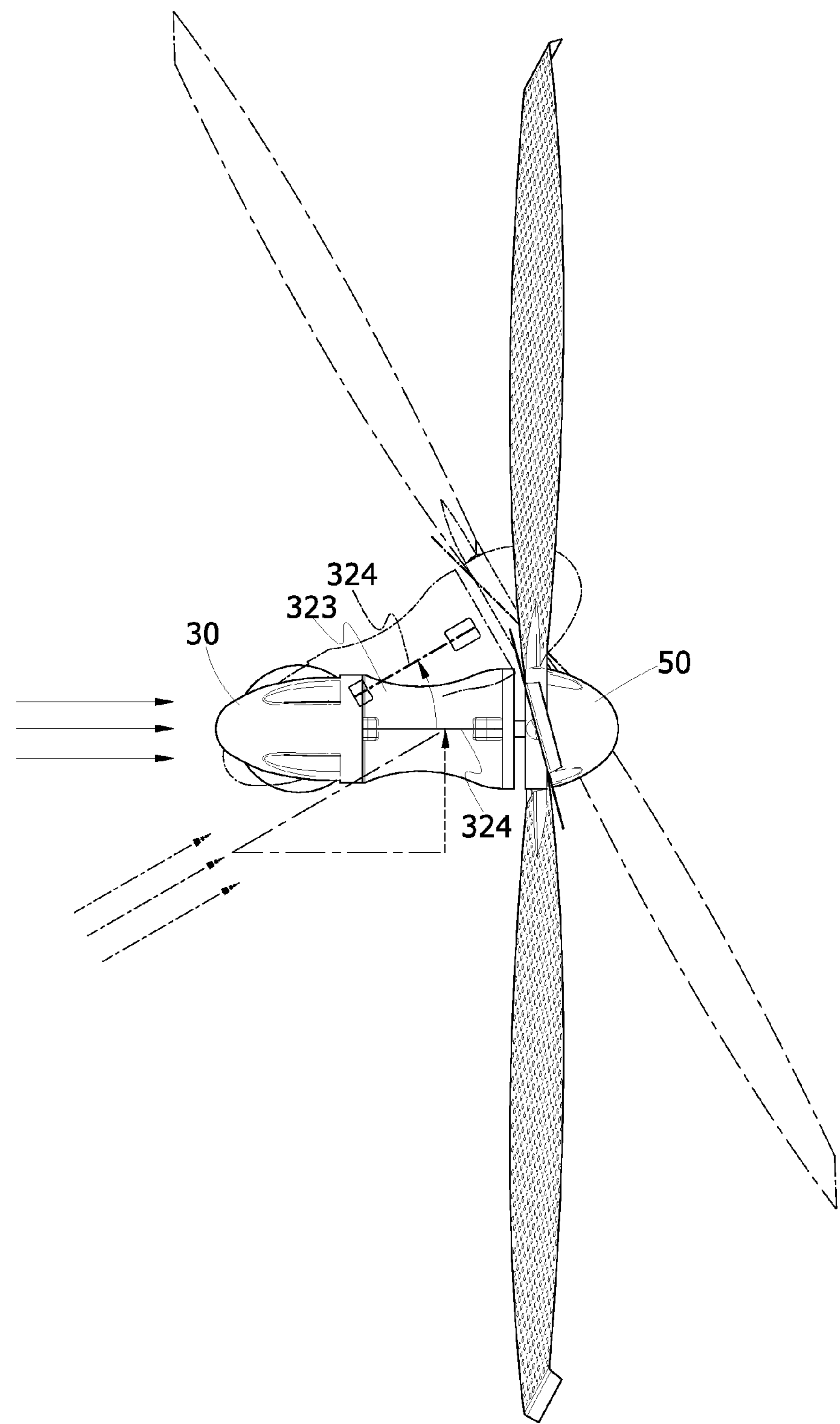
FIG. 6 is a schematic view illustrating automatic wind tracking operation of the preferred embodiment of the present invention.

Further, referring to FIGS. 2 and 6, the fin 324 set in the curved slot 323 of the nacelle 30 is substantially parallel to the direction of airflow (arrows shown in the drawing indicating the direction of the airflow) so that it also works to block the airflow when the airflow rises. Thus, an arrangement of multiple fins 324 may provide an effect of flow regulation. Further, when the airflow changes direction, the fin 324 provides a deflecting angle with respect to the direction of the airflow, so that the airflow applies a driving force to the fin 324 to angularly shift the nacelle 30 thereby maintaining the vane wheel 50 in alignment with the wind direction. This is another feature of the present invention.

As described above and shown in FIGS. 2-6, the present invention, when being practiced, offers the following advantages:

(1) The present invention provide a nacelle 30 that has a concave curved streamlined design and that, when receiving high speed airflow acting thereon, provides the features of airflow regulation, increase of wind pressure, and improve the rising angle of exiting airflow, so as to significantly enhance the utilization efficiency of wine energy in wind generation operations.

(2) The present invention provide a blade 52 that has an end forming a down wash 523, which suppresses the occurrence of tip vortex and thus significantly increases the performance of wind generation operations.

(3) The present invention provides at least one fin 324 set in a curved slot 323 for maintaining the vane wheel 50 in constant alignment with wind direction to thereby realize automatic wind tracking.

(4) Further, the present invention provides a blade having a surface forming a plurality of dimples 53 resembling a surface of a golf ball, which reduces air drag, also reduces turbulence and wind noise, concentrates air flow rate and direction, reduces dusts, and extends the lifespan of the vane wheel 50 and provides a silencing effect While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A wind turbine, comprising:

a nacelle, which comprises a nose and a body, the nacelle body forming a circumferentially extending curved slot, which comprises a front portion that forms a reducing section and a rear portion that forms an expanding section, a valley being defined between the reducing section and the expanding section;

a dynamo, which is received in the nacelle and comprises shaft, which is rotatable to generate electrical power; and a vane wheel, which is coupled to the shaft and comprises a hub, the hub having a circumference from which a plurality blades radially extends, each blade having an end forming a down wash, the vane wheel and the shaft of the dynamo forming a driving coupling therebetween.

2. The wind turbine according to claim 1, wherein the circumferentially extending curved slot receives at least one fin set therein, the fin being substantially parallel to an axial direction of the nacelle body.

3. The wind turbine according to claim 1, wherein the down wash is bent in a direction opposite to a windward surface of the respective blade and forms an included angle, which is substantially equal to 90 degrees, with respect to the blade.

4. The wind turbine according to claim 1, wherein the down wash is bent in a direction opposite to a windward surface of the blade and forms an included angle, which is greater than 90 degrees, with respect to the blade.

5. The wind turbine according to claim 1, wherein each blade has a windward surface that forms a plurality of dimples that have a hemispherical configuration.

6. The wind turbine according to claim 1, wherein each blade has a windward surface and a leeward surface both forming a plurality of dimples that have a hemispherical configuration.

7. The wind turbine according to claim 1, wherein the front portion of the circumferentially extending curved slot that forms the reducing section is of a configuration that shows successive reduction of diameter, and the expanding section extends from an end of the reducing section and is of a configuration that shows successive expansion of diameter, the reducing section and the expanding section forming a joint therebetween that form the valley.

* * * * *